(12) United States Patent
Yonezawa

(10) Patent No.: US 6,339,507 B1
(45) Date of Patent: Jan. 15, 2002

(54) GALILEO TYPE STEREOMICROSCOPE AND OBJECTIVE LENS THEREOF

(75) Inventor: Yasuo Yonezawa, Zushi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/492,180

(22) Filed: Jan. 27, 2000

(30) Foreign Application Priority Data

Jan. 28, 1999 (JP) .......................................... 11-020827
Dec. 1, 1999 (JP) .......................................... 11-341663

(51) Int. Cl.$^7$ .............................. G02B 21/02; G02F 1/33
(52) U.S. Cl. ..................... 359/656; 359/657; 359/658; 359/659; 359/660; 359/661; 359/308
(58) Field of Search ............................. 359/656–661, 359/368–383

(56) References Cited

U.S. PATENT DOCUMENTS

| | | | | |
|---|---|---|---|---|
| 5,227,914 A | * | 7/1993 | Hanzawa | 359/377 |
| 5,982,559 A | * | 11/1999 | Furutake | 359/656 |
| 6,081,371 A | * | 6/2000 | Shioda | 359/372 |

\* cited by examiner

*Primary Examiner*—Georgia Epps
*Assistant Examiner*—Michael A. Lucas
(74) *Attorney, Agent, or Firm*—Miles & Stockbridge P.C.

(57) ABSTRACT

A Galileo type stereomicroscope permits an observer to change its eye-level by varying a space between an objective lens and a pair of a focal variable magnification lenses. The Galileo type stereomicroscope satisfies following condition: $Z>f_0/3$, where Z denotes a variable range of the eye-level and $f_0$ denotes a focal length of an objective lens to be used. The objective lens for the Galileo type stereomicroscope keeps imaging quality up to a periphery of an image field while the eye-level is changed.

4 Claims, 5 Drawing Sheets

FIRST LENS GROUP  SECOND LENS GROUP  THIRD LENS GROUP

HIGH EYE LEVEL SIDE

LOW EYE LEVEL SIDE

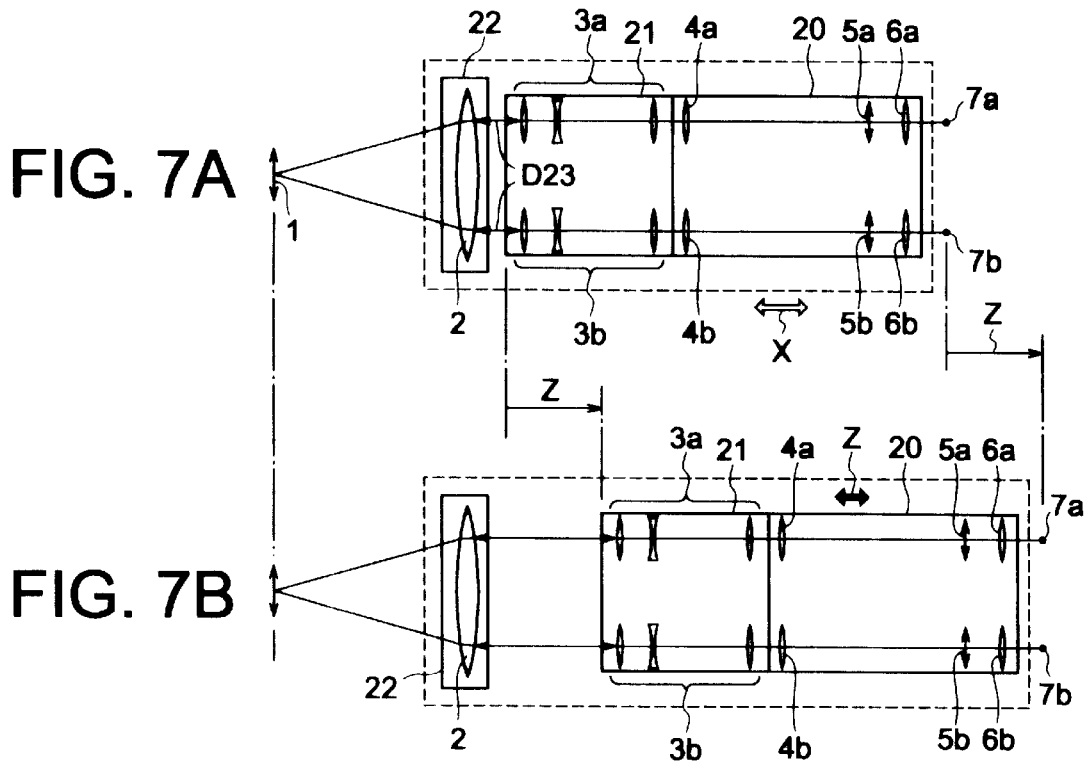
FIG. 7A
FIG. 7B
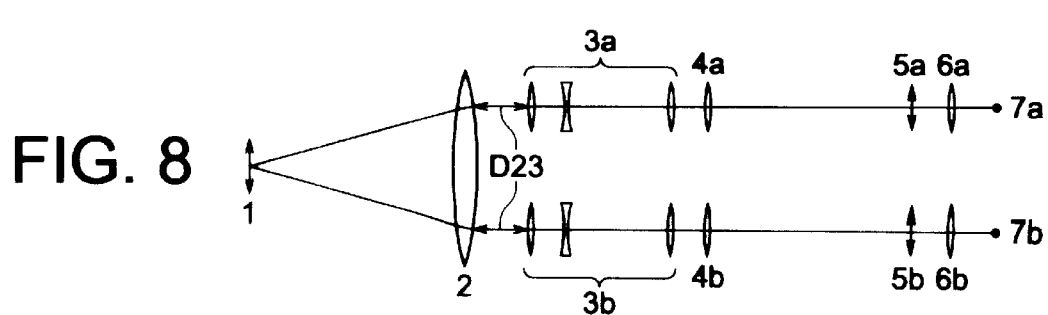
FIG. 8

GALILEO TYPE STEREOMICROSCOPE AND OBJECTIVE LENS THEREOF

This application claims the benefit of Japanese Patent applications Nos. 11-020827 and 11-341663 which are hereby incorporated by reference.

BACKGROUND OF THE INVENTION

1. Field of the Invention

This invention relates to a stereomicroscope, in particular, to a parallel type (hereinafter referred to as Galileo type) stereomicroscope and to an objective lens used for it.

2. Related Background Art

FIG. 8 shows an optical system of a Galileo type stereomicroscope according to prior art. In the Galileo type stereomicroscope, images of an object for left optical path and right optical path are formed at infinity by an objective lens 2 used in common with left and right optical paths. A focal variable magnification lenses 3a and 3b independently arranged in the left and right optical paths, respectively, vary magnifications of both light paths. Then, imaging lenses 4a and 4b independently arranged in the left and right optical paths form images of the object at left and right image planes 5a and 5b, respectively. Finally, the images are observed through left and right eyepieces 6a and 6b, respectively.

At this time, an eye-level, which corresponds to the height between the object plane and the eyepoint of the eyepiece 6a (or 6b), is fixed in the Galileo type stereomicroscope according to prior art. When plurality of observer with difference in their physique use the same stereomicroscope, an observer having a physique not suitable for this stereomicroscope is compelled to keep observation in a forced posture. Therefore, there is a defect that this stereomicroscope is not suitable for long observation.

In order to solve the defect, it is necessary to make the distance D23 in FIG. 8 variable. If this method is applied to an objective lens for a Galileo type stereomicroscope according to prior art, a large amount of coma is produced in a periphery of an image field. As a result, image quality in the periphery of the image field is severely degraded. Therefore, this becomes another defect.

SUMMARY OF THE INVENTION

The present invention was conceived taking the above-mentioned problems into consideration. An object of the present invention is to provide a Galileo type stereomicroscope capable of adjusting an eye-level at observer's desire, and an objective lens keeping small change in aberration and keeping good imaging quality up to a periphery of an image field while the eye-level is changed.

The Galileo type stereomicroscope of the present invention comprises; an objective lens (2), a pair of a focal variable magnification lenses (3a, 3b), a pair of imaging lenses (4a, 4b), and a pair of eyepiece lenses (6a, 6b) are arranged in order from an object side, wherein said objective lens (2), said pair of a focal variable magnification lenses (3a, 3b), said pair of imaging lenses (4a, 4b) and said pair of eyepiece lenses (6a, 6b) are moved in a body (integrally) relative to an microscope holder (13, 14, 15), and a space between said objective lens and said pair of a focal variable magnification lenses can be adjustable.

In the Galileo type stereomicroscope according to the present invention, the adjustment of said space is performed by moving said objective lens while said pair of a focal variable magnification lenses are fixed relative to said microscope holder.

In the Galileo type stereomicroscope according to the present invention, the adjustment of said space is performed by moving said pair of a focal variable magnification lenses while said objective lens is fixed relative to said microscope holder.

In the Galileo type stereomicroscope according to the present invention, the stereomicroscope has an eye-level being variable without changing the focusing position by varying a space between an objective lens (2) and a pair of a focal variable magnification lenses (3a, 3b), wherein a variable amount Z of said eye-level satisfies the following condition;

$$Z > f_0/3$$

where $f_0$ denotes a focal length of the objective lens to be used.

In the Galileo type stereomicroscope according to the present invention, the stereomicroscope comprises, in order from the image side, a first lens group having a positive refractive power comprising a positive meniscus lens, which is disposed closest to the image, facing the convex surface to the image side, a second lens group having a negative refractive power comprising a negative lens facing a strong concave surface to the object side, and a third lens group having a positive refractive power

BRIEF DESCRIPTION OF THE DRAWINGS

FIGS. 7A and 7B shows movements of lens barrels consisting of a Galileo type stereomicroscope according to an embodiment of the present invention.

FIG. 8 shows a schematic view of a Galileo type stereomicroscope according to prior art.

DESCRIPTION OF THE PREFERRED EMBODIMENTS

Figure 1A:
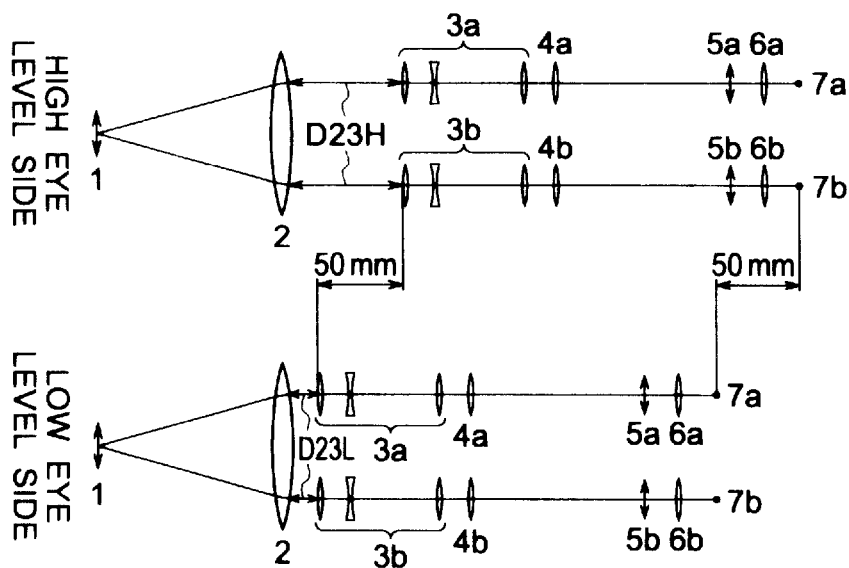
FIGS. 1A and 1B shows a schematic view of a Galileo type stereomicroscope according to an embodiment of the present invention.

In a Galileo type stereomicroscope according to the present invention, when an object is focused for observation, light beams come from an object become parallel in a space between a pair of a focal variable magnification lenses and a pair of imaging lenses, or in a space between an objective lens and a pair of a focal variable magnification lenses. Therefore, in order to make an eye-level of the Galileo type stereomicroscope variable, it is thought that either one of these spaces is to be variable. However, when the space between the a focal variable magnification lens and the imaging lens is made to be variable, since an imaging lens barrel becomes bulky, it is preferable that the space between the objective lens and the a focal variable magnification lens is made to be variable. When the space between the objective lens and the a focal variable magnification lens is made to be variable, since only the objective lens, much lighter than the lens barrel, is necessary to be moved up and down, the load on the mechanism making the space variable becomes lighter. Therefore, at first, an embodiment in which the space between the objective lens and the a focal variable magnification lens is made to be variable in order to make the eye-level variable, is explained. Secondly, another embodiment in which the space between the a focal variable magnification lens and the imaging lens is made to be variable is explained, although another embodiment has the above-mentioned problem.

In the present embodiment, providing a focus adjusting mechanism independent of the eye-level variation mechanism, a shift of focusing position produced by the change in the space between the objective lens and the a focal variable magnification lens due to varying the eye-level can be corrected. As a result, a Galileo type stereomicroscope capable of adjusting eye-level without changing focusing can be provided. The construction of the present embodiment will be described later with reference to FIGS. 4 through 7B.

In order that an observer effectively uses the function of the eye-level adjustment, it has become clear by our experiment that the following condition must be satisfied;

$$Z > f_0/3$$

where Z represents a variable amount of eye-level, and $f_0$ represents a focal length of the objective lens. When the value Z falls below the amount $f_0/3$, the Galileo type stereomicroscope according to the present invention cannot satisfy the function that each observer with different physique can always make observation in relaxed posture.

Then, the objective lens used for the present invention has to comprise, in order from the image side, a first lens group having a positive refractive power comprising a positive meniscus lens, which is disposed closest to the image, facing the convex surface to the image side, a second lens group having a negative refractive power comprising a negative lens facing a strong concave surface to the object side, and a third lens group having a positive refractive power. Unless this construction is used, good imaging quality cannot be expected. When the space between the objective lens and the a focal variable magnification lens is changed in order to vary the eye-level, because of a change in the exit pupil position of the objective lens, coma aberration varies largely, and, therefore, imaging quality in the periphery of the image field is degraded severely.

Figure 1B:
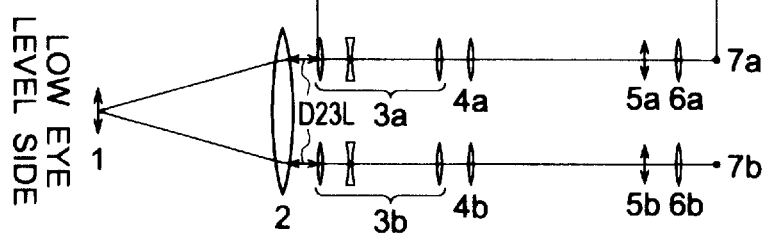

FIGS. 1A and 1B shows a schematic view of a Galileo type stereomicroscope with variable eye-level according to an embodiment of the present invention. The reference number 1 denotes an object plane, the reference number 2 denotes an objective lens used in common with the left and right optical paths, and the reference numbers 3a and 3b denote a pair of a focal variable magnification lenses. The reference numbers 4a and 4b denote a pair of imaging lenses, the reference numbers 5a and 5b denote a pair of image planes for the left and right eye, and the reference numbers 6a and 6b denote a pair of eyepieces. The reference numbers 7a and 7b denote a pair of eye points. In the present embodiment, varying the space between the objective lens 2 and the a focal variable magnification lens 3a (or 3b) performs an adjustment of the eye-level. The difference Z between the maximum value D23H and the minimum value D23L of the aforementioned space is 50 mm. In this case, the focal length $f_0$ of the objective lens 2 is 100 mm. Conditional values are as follows;

$$Z = 50 \text{ mm}$$

$$f_0/3 = 33.33 \text{ mm}.$$

In FIGS. 1A and 1B, however, each lens element is represented as a single lens, each lens element is actually composed of plurality of lenses due to correction of aberrations.

Figure 2:
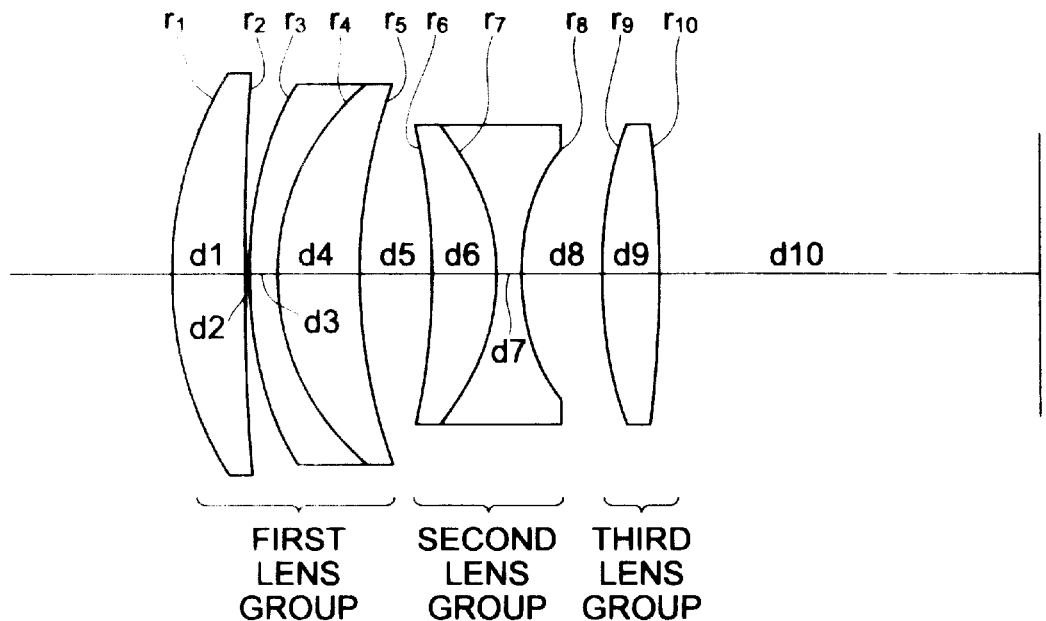
FIG. 2 shows a sectional view of an objective lens for a Galileo type stereomicroscope according to an embodiment of the present invention.

FIG. 2 shows a sectional view of an objective lens according to the present invention. The objective lens is composed of, in order from the image side, a first lens group having a positive refractive power consisting of a positive meniscus lens, which is disposed closest to the image, facing the convex surface to the image side, and a cemented positive meniscus lens, a second lens group having a negative refractive power consisting of a cemented negative lens facing a strong concave surface to the object side, and a third lens group having a positive refractive power consisting of a double convex lens.

An example of numerical data for an objective lens according to the present invention is provided in Table 1 below. In Table 1, the reference symbol r denotes, in mm, radius of curvature of each surface, the reference symbol d denotes, in mm, interval(space) between the surfaces, the reference symbol $n_d$ denotes refractive index for d-line (587.6 nm), and the reference symbol $v_d$ denotes Abbe number for d-line (587.6 nm). The surface numbers are indicated in order from the image side to the object side.

TABLE 1

| surface number | r | d | n | $v_d$ |
|---|---|---|---|---|
| | $f_0$ = 100 mm | | | |
| 1 | 47.4920 | 9.0 | 1.670249 | 57.53 |
| 2 | 316.2400 | 0.5 | 1.0 | |
| 3 | 48.7130 | 3.5 | 1.740000 | 28.19 |
| 4 | 30.2820 | 10.0 | 1.620409 | 60.14 |
| 5 | 66.4370 | 9.0 | 1.0 | |
| 6 | −98.4990 | 8.0 | 1.717360 | 29.46 |
| 7 | −28.4870 | 3.0 | 1.672700 | 32.17 |
| 8 | 28.4870 | 10.0 | 1.0 | |
| 9 | 56.6880 | 7.0 | 1.796310 | 40.90 |
| 10 | −154.7100 | 47.0388 | | |

Figure 3A:
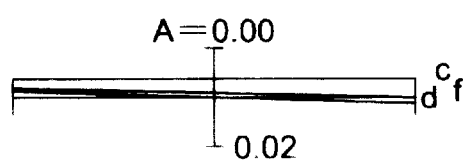
FIGS. 3A and 3B shows aberration charts of coma according to the objective lens shown in FIG. 2.
Figure 3A:
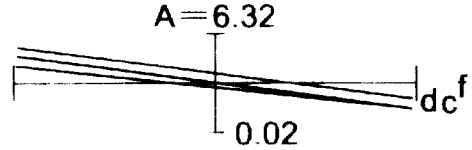
Figure 3A:
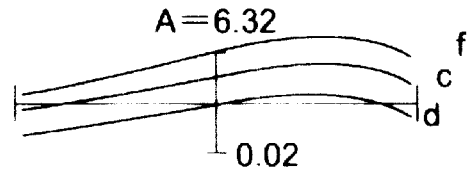
Figure 3B:
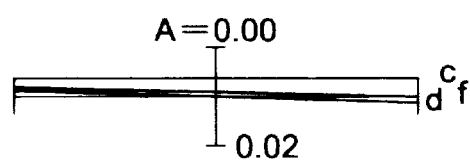
Figure 3B:
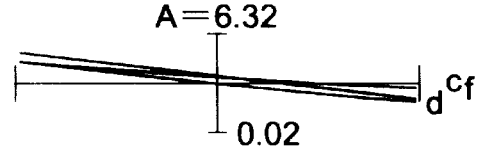
Figure 3B:
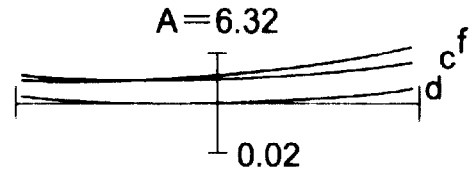

FIGS. 3A and 3B shows aberration chart of coma according to the present embodiment. Each aberration chart shows coma when collimated light beam is incident on the objective lens from the image side, and is focused on the object plane. In each aberration chart, the reference symbol A denotes an angle of view, the reference symbol d denotes aberration for d-line (587.6 nm), c for c-line (656.3 nm), and f for f-line (486.1 nm).

As is apparent from each chart, coma is well corrected from high eye-level side to low eye-level side, and variation of coma is also very small.

Figure 4:
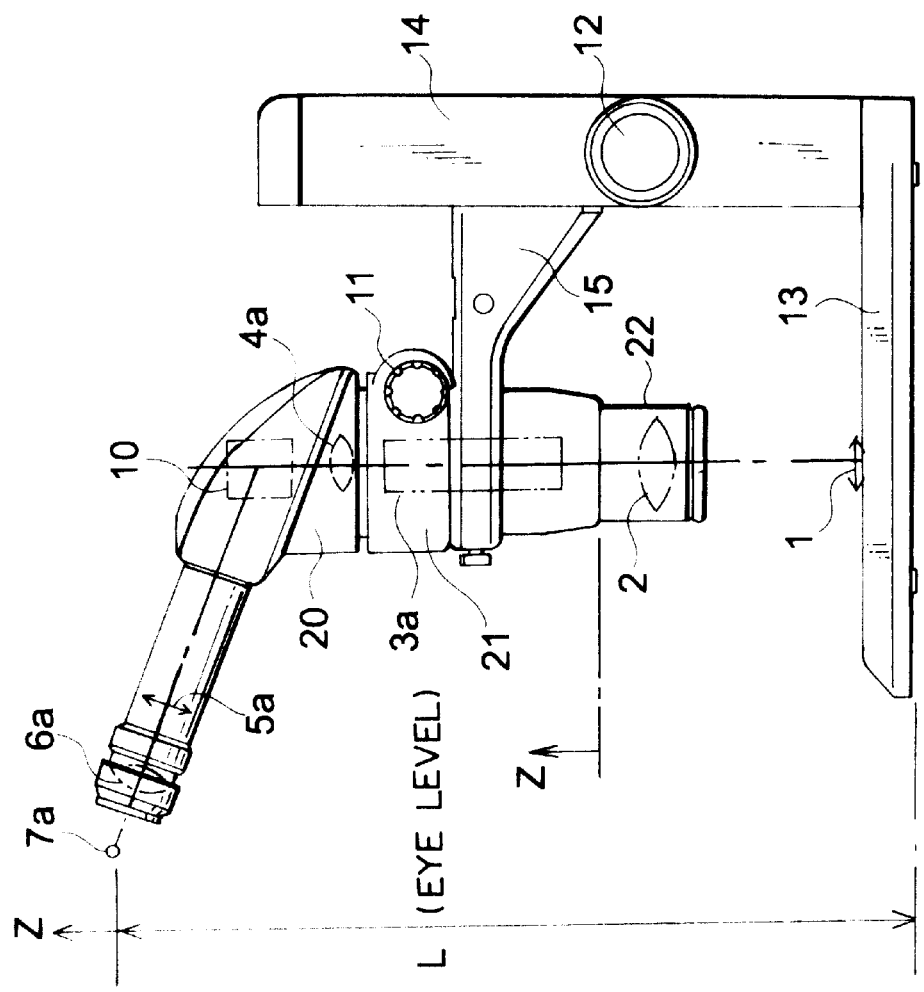
FIG. 4 shows a side view of a Galileo type stereomicroscope according to an embodiment of the present invention.
Figure 5:
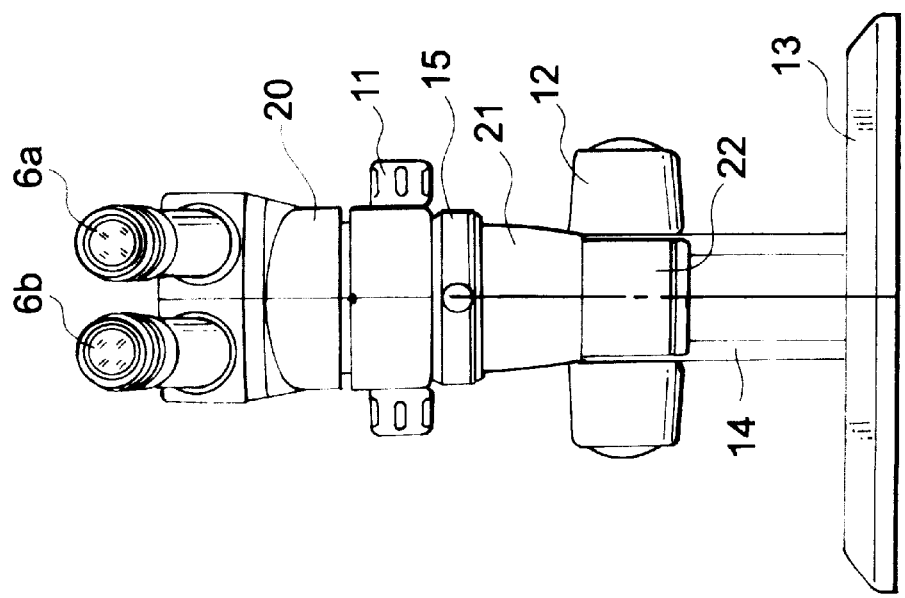
FIG. 5 shows a front view of a Galileo type stereomicroscope according to an embodiment of the present invention.
Figures 6A, 6B, 6C:
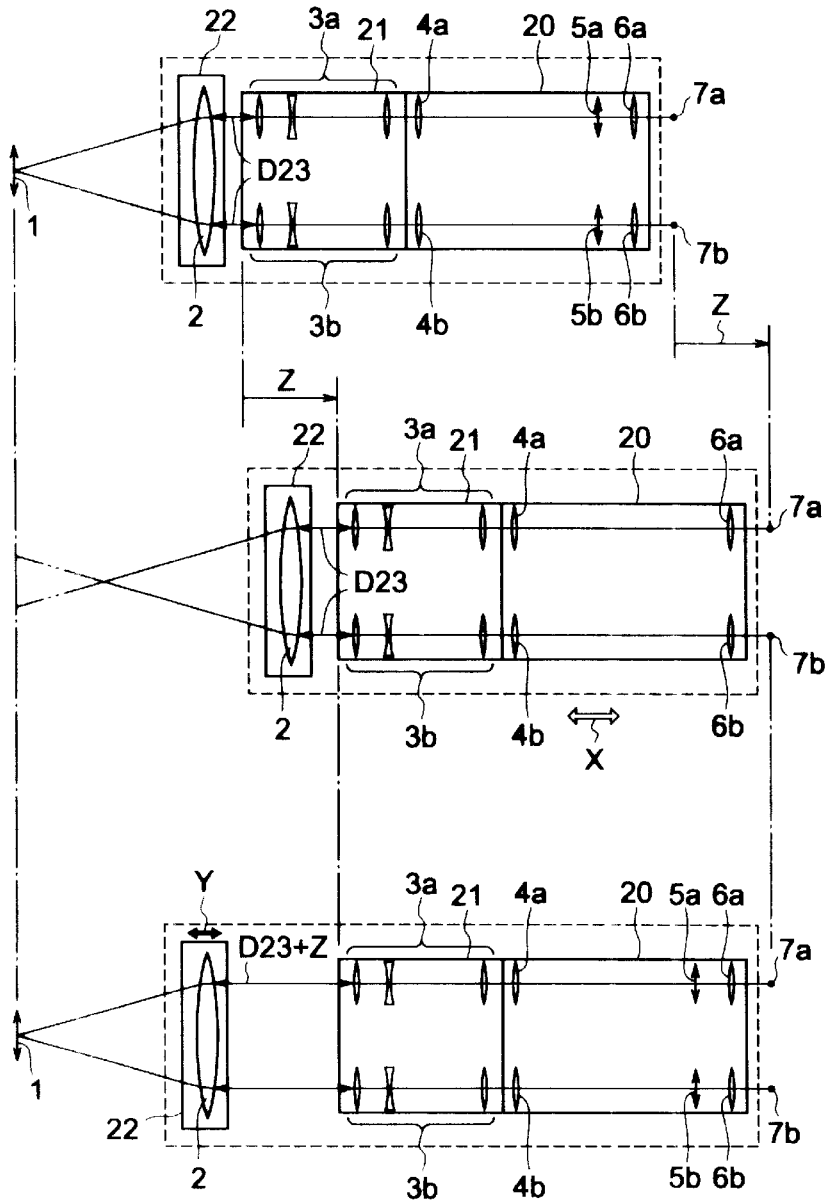
FIGS. 6A to 6C shows movements of lens barrels consisting of a Galileo type stereomicroscope according to an embodiment of the present invention.

The operation of a Galileo type stereomicroscope according to aforementioned embodiment of the present invention is described with reference to FIGS. 4 through 6B. FIGS. 4 and 5 are a side view and a front view of the Galileo type stereomicroscope, respectively. FIGS. 6A to 6c are charts describing the movement of each lens barrel composing the Galileo type stereomicroscope.

In FIGS. 4 and 5, an eyepiece lens barrel 20 contains therein a pair of eyepieces 6a, 6b, a pair of imaging lenses 4a, 4b, and a prism 10 disposed between the eyepiece and the imaging lens. A variable magnification lens barrel 21 contains a pair of a focal variable magnification lenses 3a, 3b, equips with a magnification controlling knob 11, and is connected to the eyepiece lens barrel 20. An objective lens barrel 22 contains an objective lens 2 and is connected to the variable magnification lens barrel 21 by lead screw. The objective lens barrel 22 can be varied along the optical axis with respect to the variable magnification lens barrel 21 by turning(rotating) the objective lens barrel 22.

A microscope holder is composed of a microscope main body holding arm 15, a frame 14, a base 13, and a focusing handle 12. The arm 15 holds a main body (20, 21, and 22) by holding the variable magnification lens barrel 21 and is movably attached to the frame 14 by a rack and pinion mechanism in order to be moved vertically. By turning the focusing handle 12, the arm 15 can be moved up and down along to the optical axis of the objective lens 2 with respect to the frame 14.

In FIG. 4.the eye-points 7a, 7b are separated from the plane where the microscope holder is placed by L (eye-level) and can be varied by an amount Z of the eye-point adjustment. The eye-point adjustment will be described with reference to FIGS. 6A to 6C.

The Galileo type stereomicroscope shown in FIGS. 6A to 6C has such a structure that the main body (20, 21, and 22) can be moved in one body (i.e. integrally) by turning the focusing handle 12, and only the objective lens barrel 22 can be moved relative to the variable magnification lens barrel 21 by turning the objective lens barrel 22 itself.

In FIGS. 6A to 6C, in order to adjust the eye-points 7a, 7b, the main body (20, 21, and 22) shown by broken line in FIG. 7A is moved by an amount Z required by an observer by means of turning the focusing handle 12 (see arrow X in FIG. 6B). Then, only the objective lens barrel 22 is moved (see arrow Y in FIG. 6C).

By the way, the order of adjustment operation can be reverse. From the state shown in FIG. 6A, at first, only the objective lens barrel 22 is moved by an amount Z(see FIG. 6C). Then, the main body (20, 21, and 22) is moved by the amount Z by means of turning the focusing handle 12(see arrow X in FIG. 6B).

By varying the space between the objective lens 2 and the a focal variable magnification lenses 3a and 3b, where the light rays pass parallel with each other, the space between the objective lens barrel 22 and the variable magnification lens barrel 21 can be adjusted, and also the focusing of the main body can be adjusted. As a result, the eye-points 7a, 7b can be adjusted with keeping in-focus state of the specimen 1.

Another Galileo type stereomicroscope capable of adjusting the eye-point will be described with reference to FIGS. 7A and 7B. The way of adjusting the eye-point is different from the way described above in FIGS. 4 through 6C.

The construction in FIGS. 6A to 6C is such that the objective lens barrel 22 is moved in order to adjust the space between the objective lens barrel 22 and the variable magnification lens barrel 21. On the other hand, the construction in FIGS. 7A and 7B is such that the variable magnification lens barrel 21 is moved (together with the eyepiece lens barrel 20 in a body).

Therefore, the eye-point adjustment of 7a, 7b can be performed from the state in FIG. 7A to the state in FIG. 7B by moving the variable magnification lens barrel 21 (together with the eyepiece lens barrel 20 in a body) relative to the objective lens barrel 22 by the amount Z of the eye-point adjustment.

According to the present invention described as above, a Galileo type stereomicroscope with sufficiently wide variable range of eye-level is provided. Further, an objective lens suitable for the above microscope having a good imaging quality up to periphery of the image field while the eye-level is largely changed, is also provided.

What is claimed is:

1. A Galileo type stereomicroscope comprising, in order from an object side:

an objective lens;

a pair of afocal variable magnification lenses;

a pair of imaging lenses; and a pair of eyepiece lenses, wherein said objective lens, said pair of afocal variable magnification lenses, said pair of imaging lenses and said pair of eyepiece lenses are moved integrally relative to a microscope holder, and a space between said objective lens and said pair of afocal variable magnification lenses can be adjustable; and wherein the adjustment of said space is performed by moving said objective lens while said pair of afocal variable magnification lenses are fixed relative to said microscope holder.

2. An objective lens for said Galileo type stereomicroscope according to claim 1, comprising, in order from an image side:

a first lens group having a positive refractive power comprising a positive meniscus lens, which is disposed closest to the image, facing the convex surface to the image side, a second lens group having a negative refractive power comprising a negative lens facing a strong concave surface to an object side, and a third lens group having a positive refractive power.

3. A Galileo type stereomicroscope capable of varying an eye-level without changing a focusing position by changing a space between an objective lens and a pair of afocal variable magnification lenses, wherein a variable amount Z of said eye-level satisfies the following condition;

$$Z > f_0/3$$

where the reference symbol $f_0$ represents a focal length of said objective lens.

4. An objective lens for said Galileo type stereomicroscope according to claim 3, comprising, in order from an image side:

a first lens group having a positive refractive power comprising a positive meniscus lens, which is disposed closest to the image, facing the convex surface to the image side, a second lens group having a negative refractive power comprising a negative lens facing a strong concave surface to an object side, and a third lens group having a positive refractive power.

* * * * *